United States Patent [19]

Zimmer

[11] Patent Number: 5,083,670
[45] Date of Patent: Jan. 28, 1992

[54] REVOLVING STORAGE DEVICE FOR SMALL ITEMS

[75] Inventor: John J. Zimmer, 43 Ivy La., Cherry Hill, N.J. 08002

[73] Assignee: John J. Zimmer, Cherry Hill, N.J.

[21] Appl. No.: 581,426

[22] Filed: Sep. 12, 1990

Related U.S. Application Data

[63] Continuation of Ser. No. 426,503, Oct. 23, 1989, abandoned, which is a continuation of Ser. No. 186,953, Apr. 27, 1988, abandoned.

[51] Int. Cl.$^5$ .............................................. A47H 2/00
[52] U.S. Cl. ........................................ 211/95; 211/77; 211/163
[58] Field of Search .................. 211/95, 75, 77, 70, 211/131, 163; 312/202, 135, 252; 248/291

[56] References Cited

U.S. PATENT DOCUMENTS

| | | | |
|---|---|---|---|
| 1,029,231 | 6/1912 | Ryan | 211/78 |
| 1,908,928 | 5/1933 | Stein | 211/78 |
| 1,927,283 | 9/1933 | Hernandez | 211/78 |
| 1,977,400 | 10/1934 | Offery et al. | 211/78 X |
| 2,868,386 | 1/1959 | Seyforth | 211/95 |
| 3,505,515 | 4/1977 | Adra | 248/291 X |
| 3,734,439 | 5/1973 | Wintz | 248/291 |
| 4,452,362 | 6/1984 | Mancin | 211/75 |
| 4,976,359 | 12/1990 | Hardy | 211/131 |

FOREIGN PATENT DOCUMENTS

| | | | |
|---|---|---|---|
| 1269311 | 5/1968 | Fed. Rep. of Germany | 211/95 |
| 712410 | 7/1954 | United Kingdom | 211/77 |

*Primary Examiner*—Ramon O. Ramirez
*Attorney, Agent, or Firm*—Norman E. Lehrer

[57] ABSTRACT

A revolving storage device useful for organizing and storing small items in a multiplicity of containers. The device provides a drum assembly comprised of spaced-apart multi-sided end caps to which an equal number of side panels disposed therebetween, are affixed. The side panels include recessed receptacles for receiving the containers. The assembly exhibits structural integrity by virtue of the joints between adjacent panels formed of mitered edges and an internal ledge within the end caps on which the extremities of the side panels rest. The end caps include unitary shaft stubs which are engaged by a bracket to provide support for the assembly. A simple but effective detent system employing a protuberance in the bracket and depressions in an end cap permit desired angular orientations of the device.

16 Claims, 2 Drawing Sheets

REVOLVING STORAGE DEVICE FOR SMALL ITEMS

This application is a continuation of prior application Ser. No. 426,503, filed Oct. 23, 1989, now abandoned which was a continuation of prior application Ser. No. 186,953, filed Apr. 27, 1988, now abandoned.

BACKGROUND OF THE INVENTION

Numerous situations exist where it is necessary to organize and store small items or parts such as nails, nuts and bolts, arts-and crafts supplies, and sewing needs. Further, it is desirable that the items so organized be readily visible and easily accessible.

In order to achieve the foregoing, devices of various design have been developed over a long period of time. One such device for storing and displaying small parts is described in U.S. Pat. No. 2,936,901 which issued to George D. Siemantel on May 17, 1960. In this patent, the parts to be stored are placed in transparent containers which are mounted on a rotatable body member. Friction means are provided between the body member and its support means to maintain the storage containers in a relatively fixed position in the absence of manual rotation of the body member.

A superficial resemblance exists between the Siemantel device and that described in the present application. However, if the devices are scrutinized, important design differences are revealed and it is apparent that the present device is a significant improvement over that taught in the Siemantel patent. Such differences will be obvious from the detailed description of the device of the present invention appearing hereinafter. For now, it will be helpful to note some of the substantial improvements appearing in virtually every component comprising the present device, such as:

(a) the simplified integral detent system having negligible wear and requiring no adjustment, for retaining the container-supporting drum in place;

(b) the single easily mounted bracket for supporting the drum;

(c) the shaft stubs and stand-off washers incorporated into the drum end caps to eliminate a central shaft and ancillary hardware;

(d) the mitered longitudinal edges of the panels forming the drum and the internal ledges within the end caps on which the panels rest to provide structural integrity; and (e) the incorporation of recessed threaded receptacles in the panels for receiving the containers to eliminate the need for separate parts therefor.

Notwithstanding the existence of various small item storage devices, such as that taught by Siemantel, what is desired is a device which is easily assembled from a minimal number of parts, which has superior structural integrity and long life, which requires no maintenance or periodic adjustments and which may be easily mounted and operated. The device of the present invention fills such a need.

SUMMARY OF THE INVENTION

In accordance with the present invention, a revolving device is provided to organize and store small parts or items of various descriptions.

The device comprises a drum assembly, a support bracket and a plurality of storage containers. The drum assembly further includes a pair of multi-sided end caps and a plurality of substantially planar side panels equal in number to the sides of the end caps. The longitudinal edges of adjacent side panels are mitered to form a tight joint. Each of the end caps has a continuous internal ledge disposed below its outer periphery and oriented parallel thereto. In fabricating the drum assemble, each side panel, in turn, is rested upon corresponding portions of the ledges of the spaced-apart end caps and the extremities of each side panel are affixed to the respective end caps.

The external surface of each end cap includes a plurality of evenly spaced, concave depressions formed therein. The depressions are arranged along the circumference of a circle concentric with the end cap and are of like number to the sides of the latter. Additionally, a centrally disposed external shaft stub and associated stand-off washer are provided as an integral part of the end cap.

A support bracket having a planar body and unitary opposed leaves in substantially transverse relationship thereto is provided. The leaves include apertures formed therein for receiving the respective shaft stubs of the end caps. At least one of the leaves includes on its inner surface adjacent the associated end cap, a protuberance which mates with the depressions in the end cap. Thus, a detent system is provided for holding the drum assembly firmly in place at predetermined angular positions as the drum assembly is rotated through 360 degrees. In practice, the bracket design is such that the leaves are biased toward each other, such that increased pressure is provided for the detent function.

Each side panel also includes a plurality of spaced-apart, recessed receptacles formed therein. Assuming that the storage containers for small items are formed with an open extremity having external threads, the receptacles include internal threads of like character to permit the containers to be screwed into place.

In operation, after the support bracket has been affixed to a firm member, such that preferably the drum assembly is oriented horizontally, rotation of the assembly is accomplished manually utilizing one or more of the storage containers as handles. In general, when the desired container is vertical, and right-side up, it may be unscrewed from the receptacle, items maybe deposited therein and/or removed therefrom and the container subsequently replaced in its receptacle.

Other features and advantages of the device of the present invention will become apparent in the detailed description which follows.

DESCRIPTION OF THE PREFERRED EMBODIMENT

Figure 1:
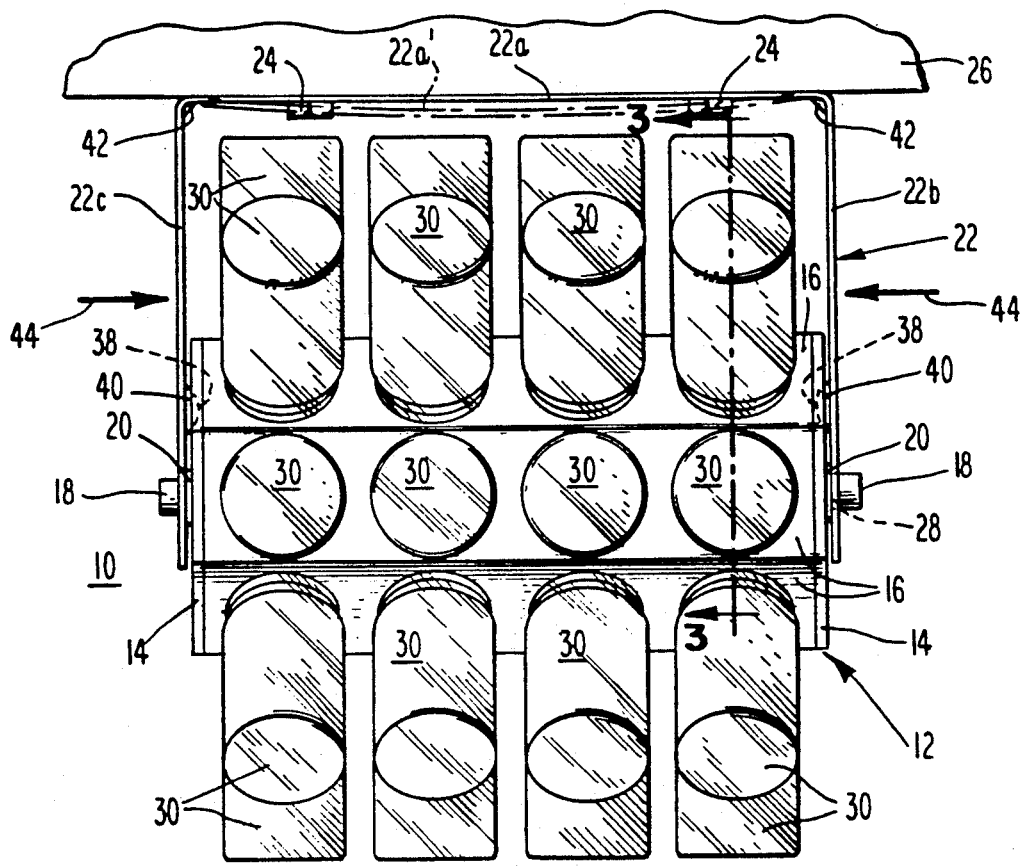
FIG. 1 is a front elevation of the device of the present invention.
Figure 2:
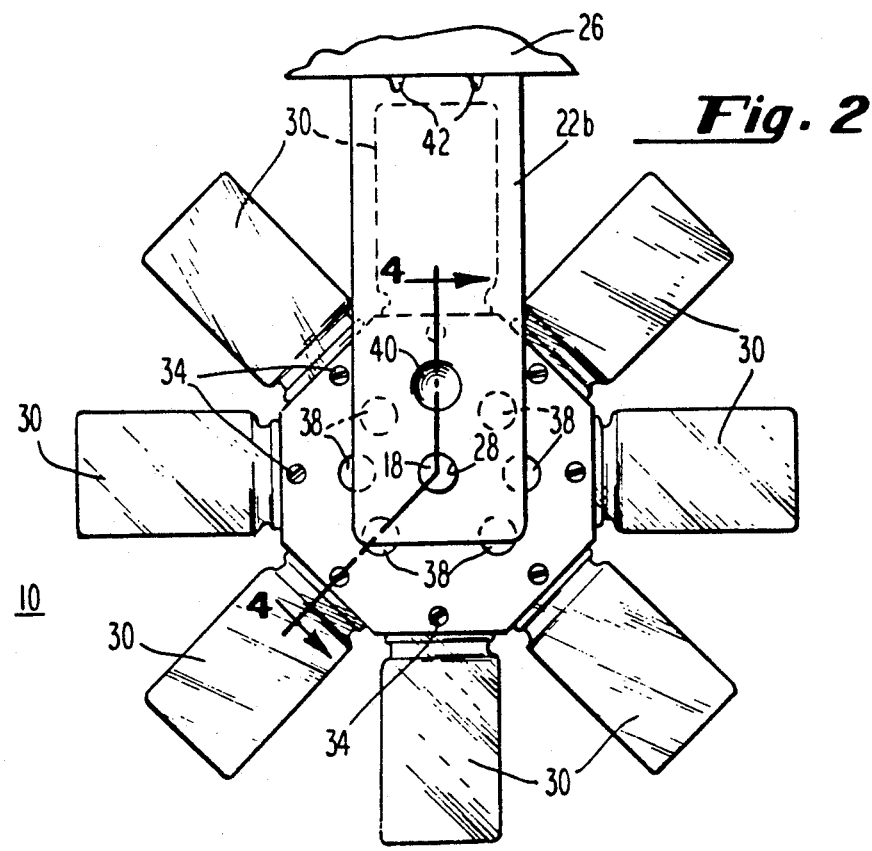
FIG. 2 is an end view of the device of the present invention.

Referring to FIGS. 1 and 2 there are illustrated the principal components of the device 10 of the present invention.

A drum assembly 12 is provided which is comprised of a pair of multi-sided end caps 14, shown as being octogonal. A plurality of side panels 16, also eight in number, are affixed to the end caps 14 in the manner described hereinafter with respect to FIGS. 3 and 4. Each end cap 14 includes a shaft stub 18 and washer 20. A generally U-shaped support bracket 22 having a planar body 22a and substantially transverse opposed leaves 22b and 22c is attached by screws 24 to a stationary member 26. Drum assembly 12 is rotatably mounted by way of shaft stubs 18 which are received within apertures 28 formed in the leaves 22b and 22c of the support bracket 22. A plurality of storage containers 30 for holding small items (not shown) are retained by the side panels 16 of the drum assembly 12 as described in detail in connection with FIG. 3.

Figure 3:
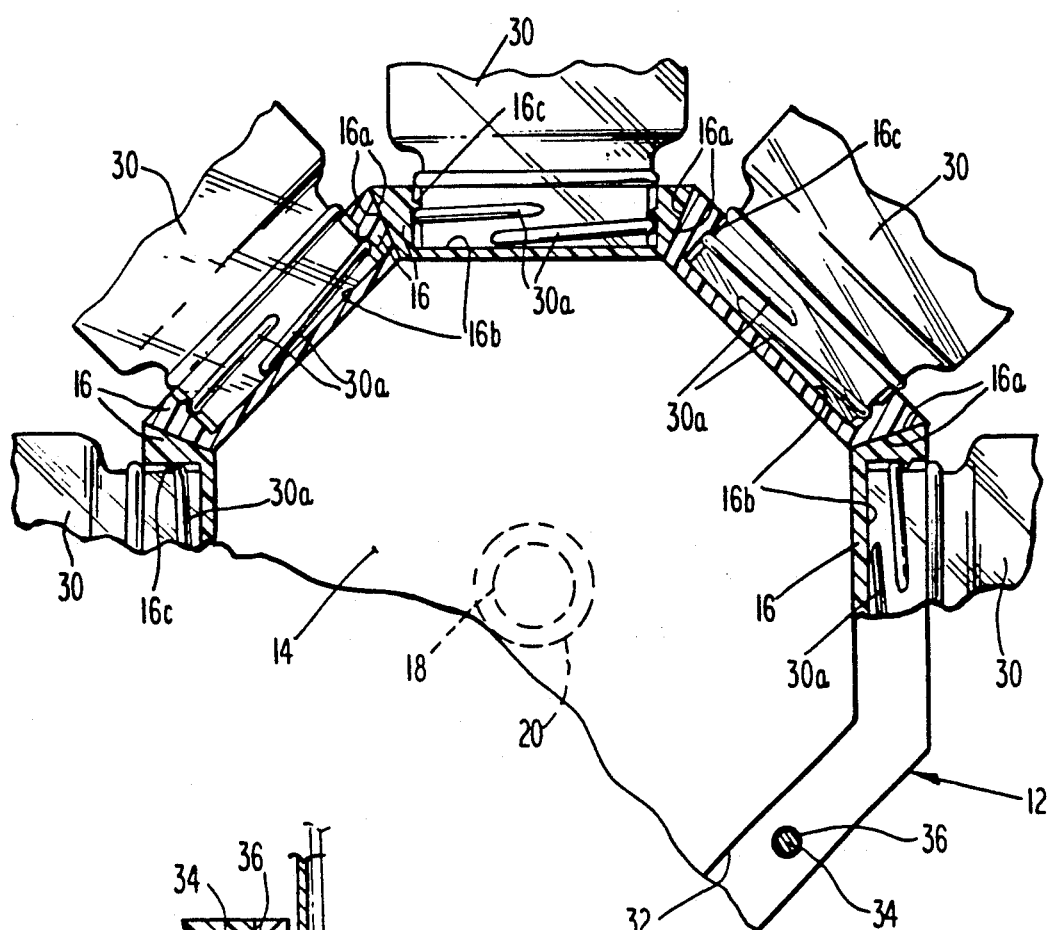
FIG. 3 is a section view taken along the lines 3—3 of FIG. 1, illustrating in particular the mitered edges of the side panels and the recessed threaded receptacles formed in the latter.

With continued general reference to FIGS. 1 and 2 and more specific reference to FIG. 3, the longitudinal edges 16a of adjacent side panels 16 are mitered to form a tight joint. The angled edges 16a of the side panels 16 add greatly to the structural integrity of the drum assembly 12 without the necessity for additional material to provide strength. By having all the longitudinal edges 16a of the side panels 16 bearing against one another, flexure of the side panels during operation of the device is essentially eliminated.

Figure 4:
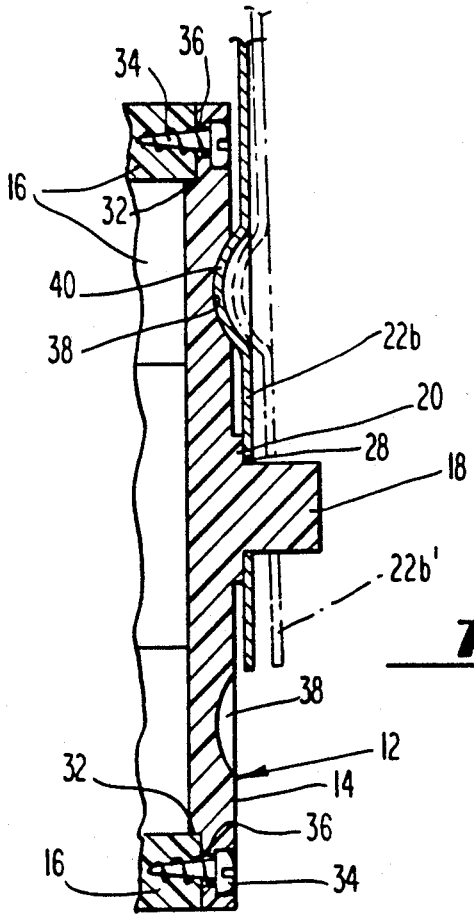
FIG. 4 is a section view taken along the lines 4—4 of FIG. 2 and showing the detent system and internal ledge of the drum assembly end cap.

As seen in FIG. 4, each of the end caps 14 has a continuous internal ledge 32 disposed below its outer periphery and oriented parallel thereto. The opposite extremities of each side panel 16 rest upon corresponding portions of the ledge 32 of the spaced-apart end caps 14. The top surface of each side panel 16 is coplanar with the periphery of the corresponding side of the end cap 14. The side panels 16 are attached to the end caps 14 by recessed self-tapping screws 34 which pass through apertures 36 in the end caps.

As also seen in FIG. 3, each side panel 16 also includes a plurality of recessed receptacles 16b having internal threads 16c, the latter accommodating the external threads 30a of the extremities of the storage containers 30. The receptacles 16b are flush with the outer surface of the side panels 16.

As distinguished from receptacles which might be affixed to the outer surfaces of the side panels, receptacles 16b may be formed as unitary parts of the panel 16 and tend to minimize the operating space required by the device 10.

A detent system is provided whereby regardless of the materials placed in the storage containers 30, the drum assembly 12 will be held firmly in place at predetermined angular positions as the assembly is revolved.

As seen in FIGS. 2 and 4, the external surface of at least one end cap 14 includes a plurality of concave depressions 38 formed therein. In actual practice, both end caps 14 may have similar depressions 38 to facilitate installation. That is, the drum assembly 12 may be mounted in either direction within the support bracket 22. The depressions 38 are arranged at forty-five degree intervals along the circumference of a circle and correspond to the number of side panels 16, namely eight. The support bracket 22 includes leaves 22b and 22c, either of which or both leaves as in FIG. 1, have protuberances 40 which mate with consecutive depressions 38 as the drum assembly 12 is rotated. Thus, the leaves 22b and 22c having the protuberances 40 are capable of flexing as indicated by the dashed outline 22b' of leaf 22b in FIG. 4, such that the protuberances 40 may move in and out of the depressions 38. The body 22a of the support bracket 22 assumes a slight bow as indicated by the dashed outline 22a' in FIG. 1, when the drum assembly 12 is inserted between leaves 22b and 22c. When device 10 is mounted to a stationary member 26 by screws 24, body 22a is straightened and the leaves 22b and 22c are biased toward each other. The detent forces directed toward the end caps 14 are indicated by the arrows 44. Reinforcing ribs 42 stiffen the juncture of leaves 22b and 22c with the body 22a of the support bracket 22 to help maintain the bias. It should be noted that the detent system of the present device requires a higher rotational force to disengage the protuberance 40 from a depression 38 than the force required to rotate the drum assembly 12 when protuberance 40 is between depressions 38. The force required to disengage the detent system remains substantially constant regardless of the weight of the items stored in the containers 30 at any given time.

In operation, assuming that the support bracket 22 has been properly mounted to either a horizontal surface as in FIG. 1, or to a vertical surface, the drum assembly 12, which is preferably horizontal, may be rotated by grasping one or more of the storage containers 30 and moving the assembly in either direction. Generally, storage containers 30 will be accessed when they are upright. At that time, the containers may be unscrewed from the receptacles 16b and after use, screwed back into receptacles at desired locations on the side panels 16.

In an actual operative embodiment of the present invention, the support bracket 22 is made of heavy gauge, zinc coated carbon steel and the drum assembly, of polypropylene. The containers 30 are of PET polymer, which is crystal clear, flexible and fracture-proof. It should be noted that the design details including the materials, the number of storage containers, the particular octogonal form of the drum assembly have been presented solely for the purposes of example, and are not to be construed as limitative of the invention.

In conclusion, there has been disclosed a convenient device for organizing and storing small items. The device has been designed for long-life, heavy duty use, making it attractive for industrial, as well as home applications. It should be understood that changes and modifications in the device, which are well within the skill of the mechanical designer may be required to suit particular purposes. Such changes and modifications, in so far as they are not departures from the scope of the invention, are intended to be covered by the claims which follow.

What is claimed is:

1. A revolving storage device for storing small items comprising:
   a drum assembly including a pair of spaced-apart multi-sided end caps and substantially planar side panels of equal number to the sides of each of said end caps,
   each of said side panels being disposed between homologous sides of said end caps and being affixed thereto, the longitudinal edges of adjacent ones of said panels being mitered to provide for the structural integrity of said drum assembly,
   each of said end caps including an internal ledge disposed below its periphery and oriented parallel thereto, the inner transverse edges of each of said side panels being rested upon a portion of said ledge to further enhance said structural integrity of said drum assembly, the top surface of each of said side panels being coplanar with the periphery of said homologous sides of said end caps associated therewith, a plurality of containers for said small items, each of said side panels including means for holding said containers, and means for rotatably supporting said drum assembly.

2. A revolving storage device as defined in claim 1 further characterized in that each of said end caps includes an integral centrally disposed external shaft stub and associated stand-off washer.

3. A revolving storage device as defined in claim 2 wherein said means for rotatably supporting said drum assembly includes a unitary U-shaped support bracket, said support bracket having a planar body and a pair of substantially transverse leaves at opposite extremities of said body, each of said leaves having an aperture formed therein for receiving said shaft stub of one of said end caps, whereby said drum assembly is disposed between said leaves of said support bracket.

4. A revolving storage device as defined in claim 3 further including a detent system for holding said drum assembly in predetermined angular positions, said detent system including a protuberance formed on the inner surface of at least one of said leaves adjacent its associated end cap, at least said last mentioned end cap having a plurality of concave depressions formed in its external surface, said depressions being arranged along the circumference of a circle concentric with said associated end cap, said leaves being biased toward each other such that a force is applied via said protuberance toward said associated end cap, said leaf bearing said protuberance being flexed as the latter enters and exits consecutive ones of said depressions during rotation of said drum assembly.

5. A revolving storage device as defined in claim 4 wherein said means included in each of said side panels for holding said containers comprise recessed receptacles, each of said receptacles having an open extremity which is flush with the top surface of the side panel for receiving one of said containers.

6. A revolving storage device as defined in claim 5 wherein each of said containers is externally threaded adjacent an open extremity thereof and each associated receptacle has a matching internal thread.

7. A revolving storage device as defined in claim 6 wherein each of said panels is affixed to one of said end caps by a screw penetrating the end cap and directed longitudinally into the extremity of the side panel adjacent the last mentioned end cap.

8. A revolving storage device as defined in claim 7 wherein said support bracket includes stiffening ribs at the respective junctures of said body and said leaves.

9. A revolving storage device as defined in claim 8 characterized in that prior to mounting on a planar surface, said body of said support bracket has an arcuate shape with said drum assembly disposed between said leaves.

10. A revolving storage device as defined in claim 9 wherein said concave depressions are evenly spaced and are of like number to the sides of each of said end caps.

11. A revolving storage device as defined in claim 10 further characterized in that said side panels are octogonal, said depressions in said associated end cap being arranged at forty-five degree intervals.

12. A revolving storage device as defined in claim 11 wherein said drum assembly is formed of polypropylene, said support bracket is carbon steel and said containers are of PET polymer.

13. A revolving storage device for storing small items comprising:

a drum assembly including a pair of spaced apart multi-sided end caps and a plurality of substantially planar side panels of equal number to the number of sides of each of said end caps;

each of said side panels being disposed between corresponding sides of said end caps and being affixed thereto;

a plurality of containers for said small items, each of said side panels including means for holding a plurality of said containers;

means for rotatably supporting said drum assembly including a U-shaped support bracket, said bracket having a substantially planar body of a length substantially equal to the length of said drum assembly and a pair of substantially transverse leaves extending from opposite extremities of said body, said leaves being biased toward each other, means on said end caps and on said leaves for rotatably mounting said drum assembly to said support bracket;

a detent system located at one end of said storage device for holding said drum assembly in predetermined angular positions relative to said support bracket, said detent system including a protuberance formed on either the leaf at said end or its associated end cap and a plurality of depressions formed in the other of said leaf or associated end cap at said end, said protuberance being biased toward said depressions and thereby entering and exiting said depressions as said drum assembly is rotated.

14. A revolving storage device as defined in claim 13 wherein said protuberance is formed on said leaf and said plurality of depressions are formed in said associated end cap.

15. A revolving storage device as defined in claim 13 including a detent system located at each end thereof.

16. A revolving storage device as defined in claim 15 wherein each detent system includes a protuberance formed on each leaf and a plurality of depressions formed in each end cap.

* * * * *